(12) United States Patent
Lee

(10) Patent No.: US 11,345,275 B2
(45) Date of Patent: May 31, 2022

(54) APPARATUS FOR IMPLEMENTING PLURALITY OF FUNCTIONS USING MICRO LENS ARRAY

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/133,481

(22) Filed: Dec. 23, 2020

(65) Prior Publication Data

US 2021/0237644 A1  Aug. 5, 2021

(30) Foreign Application Priority Data

Jan. 31, 2020 (KR) .................. 10-2020-0011615

(51) Int. Cl.
| | |
|---|---|
| *B60Q 1/26* | (2006.01) |
| *F21S 43/20* | (2018.01) |
| *G02B 3/00* | (2006.01) |
| *G02B 27/30* | (2006.01) |
| *B60R 1/12* | (2006.01) |

(52) U.S. Cl.
CPC ............ *B60Q 1/2665* (2013.01); *F21S 43/26* (2018.01); *G02B 3/0056* (2013.01); *G02B 27/30* (2013.01); *B60Q 2400/40* (2013.01); *B60R 1/1207* (2013.01)

(58) Field of Classification Search
CPC .............. B60Q 1/2665; B60Q 2400/40; B60R 1/1207; F21S 43/26
See application file for complete search history.

(56) References Cited

U.S. PATENT DOCUMENTS

| | | | |
|---|---|---|---|
| 9,121,567 B2* | 9/2015 | Iseki ..................... | F21S 43/19 |
| 10,391,933 B2* | 8/2019 | Schmidt ................ | G09F 19/18 |
| 10,434,932 B2* | 10/2019 | Goeke ................... | B60Q 1/323 |

FOREIGN PATENT DOCUMENTS

| | | |
|---|---|---|
| KR | 10-2018-0111027 A | 10/2018 |
| KR | 10-2019-0009521 A | 1/2019 |
| KR | 10-2019-0040269 A | 4/2019 |

* cited by examiner

*Primary Examiner* — Matthew J. Peerce
(74) *Attorney, Agent, or Firm* — NovoTechIP International PLLC

(57) ABSTRACT

An apparatus for implementing a plurality of functions using a micro lens array may include a light source for generating light, a collimator that forms the light from the light source as straight light and emits the straight light, a road surface pattern array that outputs a road surface pattern indicating a travel direction of a vehicle on a road surface while the light emitted from the collimator passes, and a turn indicating array disposed spaced apart from the road surface pattern array in one direction, and outputting a signal indicating the travel direction of the vehicle while the light emitted from the collimator passes.

12 Claims, 5 Drawing Sheets

APPARATUS FOR IMPLEMENTING PLURALITY OF FUNCTIONS USING MICRO LENS ARRAY

CROSS-REFERENCE TO RELATED APPLICATION

This application claims the benefit of priority to Korean Patent Application No. 10-2020-0011615, filed in the Korean Intellectual Property Office on Jan. 31, 2020, the entire contents of which are incorporated herein by reference.

TECHNICAL FIELD

The present disclosure relates to an apparatus for implementing a plurality of functions using a micro lens array, and more particularly, to an apparatus for implementing a plurality of functions using a micro lens array capable of simultaneously implementing a travel direction road surface indicator function and a turn indicator function through a change in an optical structure of the micro lens array.

BACKGROUND

In general, a welcome ceremony refers to a technology that greatly enhances a convenience and a commercial value by showing a state of a vehicle before travel of the vehicle as various information to a driver.

As a representative example of the welcome ceremony, there is a function that shows a ready state of the vehicle through a dashboard of the vehicle at a moment the driver starts the vehicle. Therefore, there is an advantage that the driver is able to conveniently recognize that a needle of the dashboard is normally operated before the travel of the vehicle by directly identifying that a needle position of the dashboard is raised to an end and then returns back. Therefore, the welcome ceremony is in a trend of being applied to increase the commercial value along with upgrading of the vehicle, and furthermore, is being developed into more diverse functions.

In addition, as a representative example of various welcome ceremonies, there is welcome lighting using a smart key.

The welcome lighting is a scheme of deactivating folding of a side mirror and lighting a puddle lamp after recognizing the smart key in the vehicle when the driver approaches the vehicle while holding the smart key.

In a recent welcome lighting, a technology in which lenses are miniaturized into a micro-size and arrayed in a projection type optical system has recently been launched on the market. This is a technology that may draw a specific pattern on a road surface through a 10 mm optical system, which is playing a role as a new lighting function (the welcome light) of the vehicle.

On the other hand, as a turn indicator function and a travel direction road surface information indicating function are separately implemented as lighting functions applied to a side mirror of a conventional vehicle, there were problems that two modules or lamps are needed, complexity of a controller is increased as synchronization of the two functions are required, and confusion is increased when the two functions are not synchronized.

SUMMARY

The present disclosure has been made to solve the above-mentioned problems occurring in the prior art while advantages achieved by the prior art are maintained intact.

An aspect of the present disclosure provides an apparatus for implementing a plurality of functions using a micro lens array, which may simultaneously implement a travel direction road surface indicator function and a turn indicator function through a change in an optical structure of the micro lens array, that may simplify a lamp package by integrating the turn indicator function and the travel direction road surface indicator function, and may reduce a load on a controller by simplifying function control because synchronization is unnecessary as the two functions are controlled by one light source.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for implementing a plurality of functions using a micro lens array includes a light source for generating light, a collimator that forms the light from the light source as straight light and emits the straight light, a road surface pattern array that outputs a road surface pattern indicating a travel direction of a vehicle on a road surface while the light emitted from the collimator passes, and a turn indicating array disposed spaced apart from the road surface pattern array in one direction, and outputting a signal indicating the travel direction of the vehicle while the light emitted from the collimator passes.

In one implementation, the light emitted from the collimator and incident on the road surface pattern array may be incident in a state parallel to an optical axis of the road surface pattern array.

In one implementation, the road surface pattern array may have one side surface forming an inclined surface inclined downward, and the inclined surface may include a reflecting plate extending downward.

In one implementation, the light emitted from the collimator and incident on the turn indicating array may be reflected by the reflecting plate and incident on the turn indicating array in parallel with an optical axis of the turn indicating array.

In one implementation, the road surface pattern array and the reflecting plate may be integrally formed.

In one implementation, the road surface pattern array may include a shield, a glass substrate disposed in close contact with a bottom surface of the shield, a first condenser lens disposed in close contact with a top surface of the shield and condensing the light emitted from the collimator, and a first projection lens disposed in close contact with a bottom surface of the glass substrate and projecting the light that has passed through the shield such that the road surface pattern is formed on the road surface.

In one implementation, the first condenser lens may be a convex lens convex upward, and the first projection lens may be a convex lens convex downward.

In one implementation, the first condenser lens and the first projection lens may be vertically and bilaterally symmetrical lenses.

In one implementation, the turn indicating array may include a glass substrate, and a second projection lens disposed in close contact with one side surface of the glass substrate and projecting light that has passed through the glass substrate to diffuse as the signal indicating the travel direction of the vehicle.

In one implementation, the turn indicating array may further include a second condenser lens disposed in close contact with the other side surface of the glass substrate and condensing the light emitted from the collimator.

In one implementation, the second condenser lens may be a convex lens convex in the other direction, and the second projection lens may be a concave lens concave in the other direction.

In one implementation, the second condenser lens may be a vertically and bilaterally symmetrical lens, and the second projection lens may be a vertically and bilaterally asymmetrical lens.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
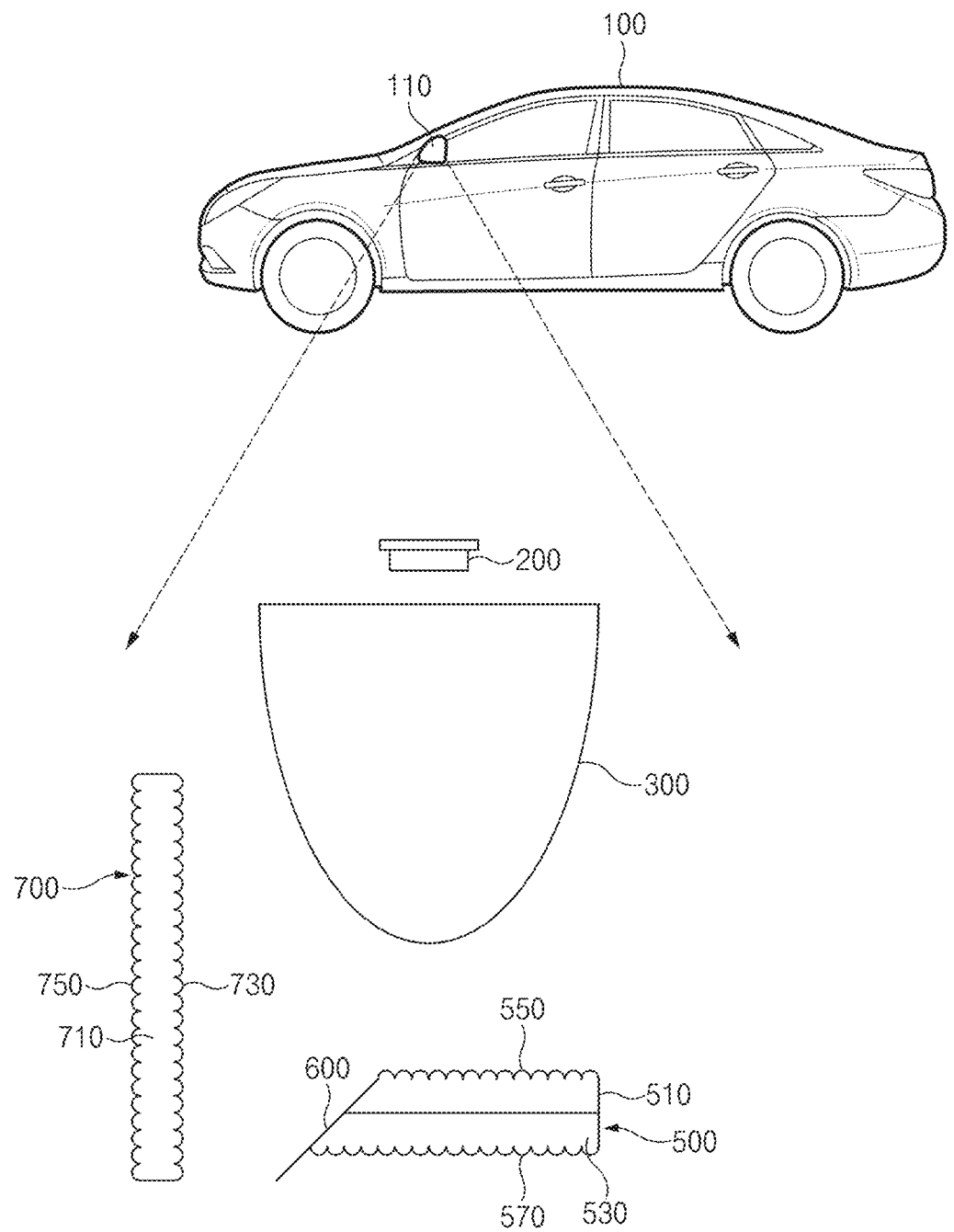
FIG. 1 is a diagram illustrating an apparatus for implementing a plurality of functions using a micro lens array according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 5.

Figure 2:
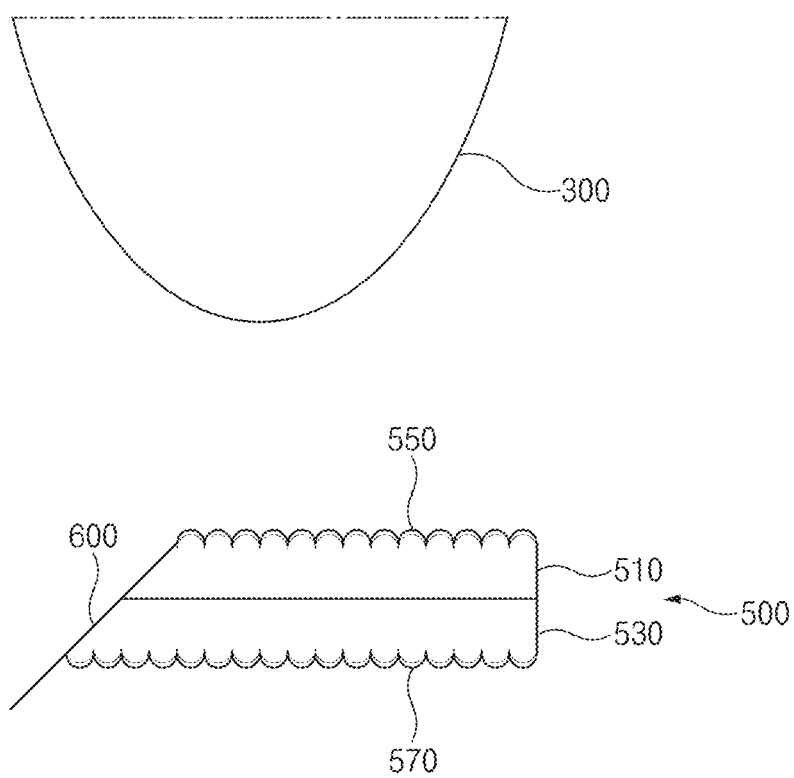
FIGS. 2 and 3 are diagrams for illustrating an optical structure constituting an apparatus for implementing a plurality of functions using a micro lens array according to an embodiment of the present disclosure.
Figure 3:
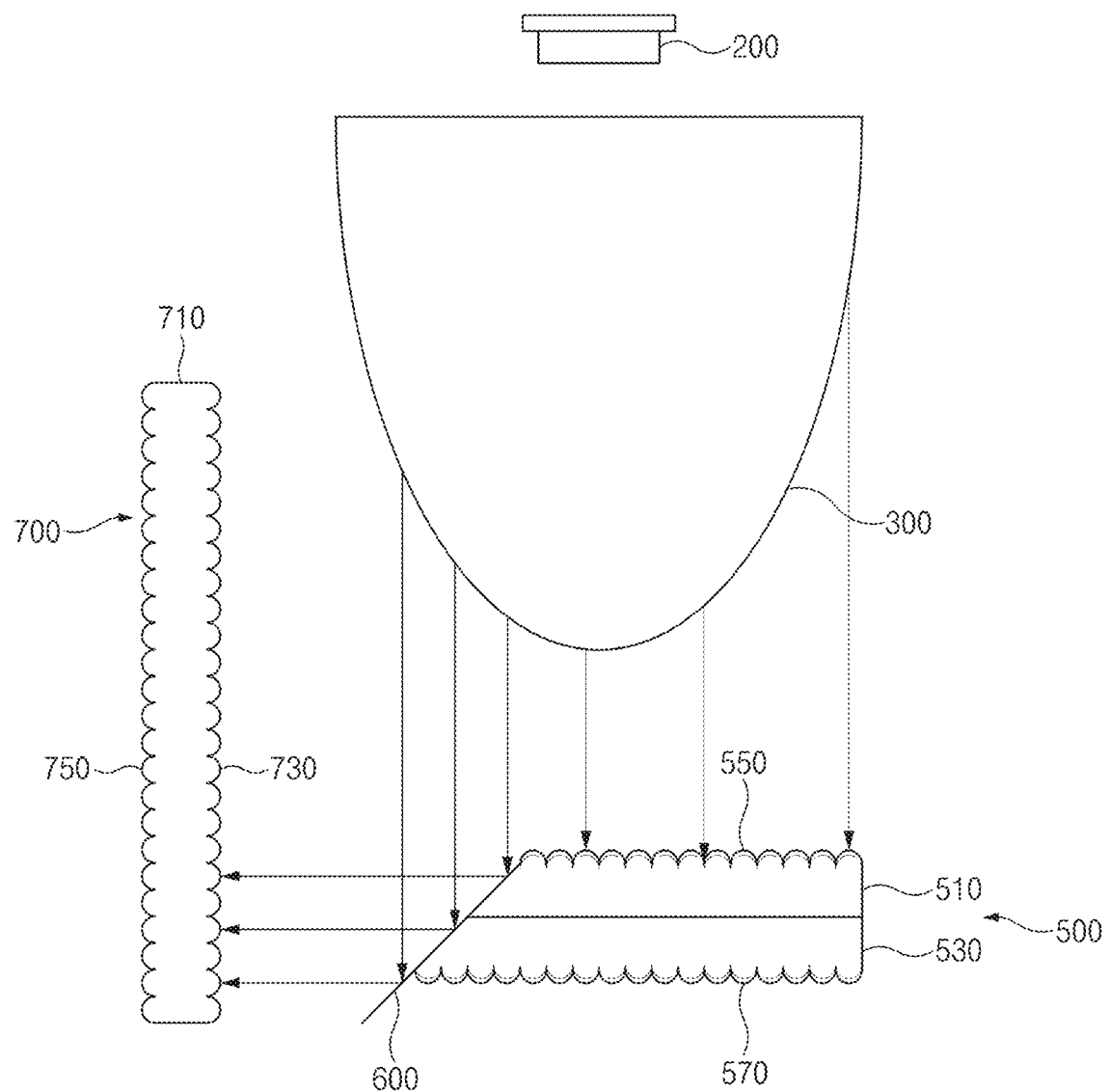
Figure 4:
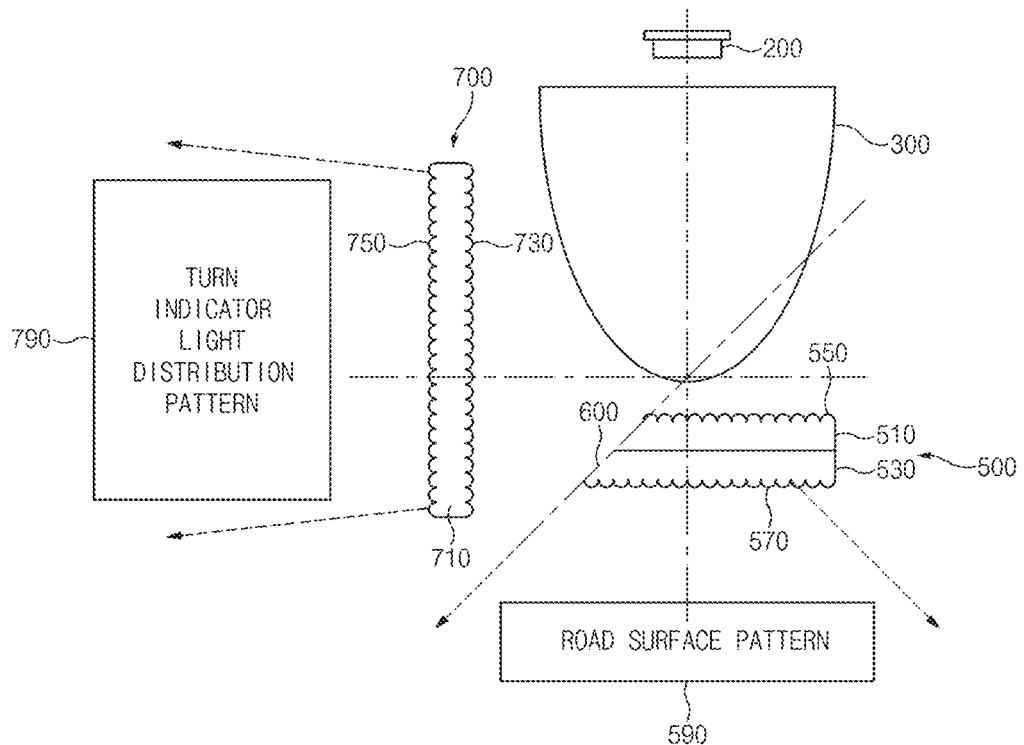
FIG. 4 is a diagram for illustrating an output pattern through an optical structure constituting an apparatus for implementing multiple functions using a micro lens array according to an embodiment of the present disclosure.
Figure 5:
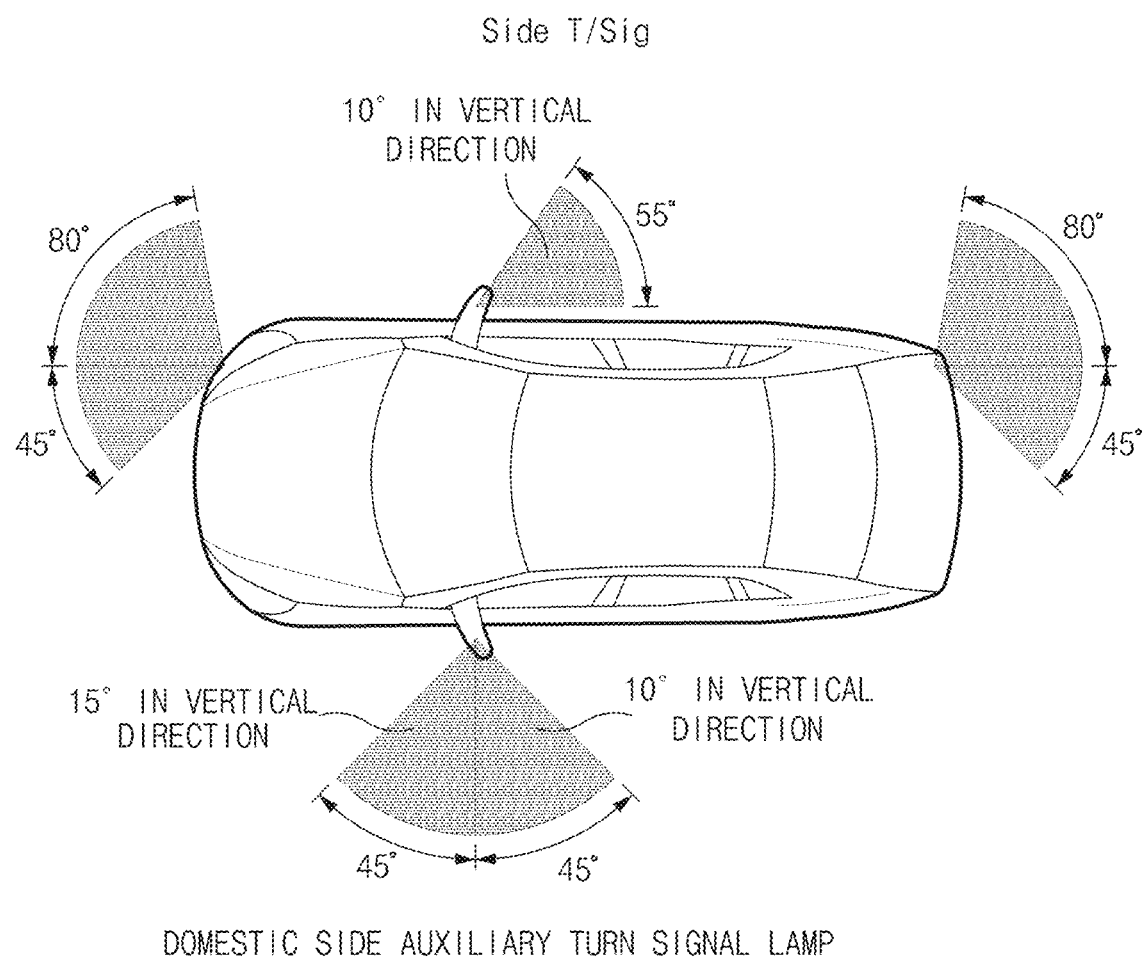
FIG. 5 is a diagram for illustrating a comparison of optical system beam angles in an apparatus for implementing a plurality of functions using a micro lens array according to an embodiment of the present disclosure.

FIG. 1 is a diagram illustrating an apparatus for implementing a plurality of functions using a micro lens array according to an embodiment of the present disclosure, FIGS. 2 and 3 are diagrams for illustrating an optical structure constituting an apparatus for implementing a plurality of functions using a micro lens array according to an embodiment of the present disclosure, FIG. 4 is a diagram for illustrating an output pattern through an optical structure constituting an apparatus for implementing multiple functions using a micro lens array according to an embodiment of the present disclosure, and FIG. 5 is a diagram for illustrating a comparison of optical system beam angles in an apparatus for implementing a plurality of functions using a micro lens array according to an embodiment of the present disclosure.

Referring to FIG. 1, an apparatus for implementing a plurality of functions using a micro lens array according to an embodiment of the present disclosure may be disposed in a side mirror 110 of a vehicle 100, which may include a light source 200, a collimator 300, a road surface pattern array 500, and a turn indicating array 700.

The light source 200 may be configured to generate light, including a single chip LED.

The collimator 300 may be disposed to be downwardly spaced apart from the light source 200, and may form the light from the light source 200 as straight light directed downward and emit the straight light.

Referring to FIG. 2, the road surface pattern array 500 may be downwardly spaced apart from the collimator 300. The light emitted from the collimator 300 may pass through the road surface pattern array 500 to be output to a road surface.

The light emitted from the collimator 300 and incident on the road surface pattern array 500 may be incident in a state parallel to an optical axis of the road surface pattern array 500.

The road surface pattern array 500 may include a shield 510, a glass substrate 530 disposed in close contact with a bottom surface of the shield 510, a first condenser lens 550 disposed in close contact with a top surface of the shield 510 and condensing the light emitted from the collimator 300, and a first projection lens 570 disposed in close contact with a bottom surface of the glass substrate 530 and projecting the light that has passed through the shield 510 to be formed on the road surface.

The first condenser lens 550 is a convex lens convex upward, and the first projection lens 570 is a convex lens convex downward. The first condenser lens 550 and the first projection lens 570 are vertically and bilaterally symmetrical lenses, which may be arranged in a form of a micro lens array in which a diameter of the lens is 0.1 mm to 1 mm and a distance between the lenses is 0.003 mm.

A portion of the light emitted from the collimator 300 may be blocked by the shield 510 and the remainder of the light may be projected to a portion below the road surface pattern array 500 through the first projection lens 570.

A pattern indicating a travel direction of the vehicle such as a left direction or a right direction may be formed in advance on the shield 510. The light emitted from the collimator 300 and not blocked by the shield 510 and projected to the portion below the road surface pattern array 500 through the first projection lens 570 may form a road surface pattern 590 that indicates the travel direction of the vehicle 100 on the road surface.

The road surface pattern array 500 may have one side surface that forms an inclined surface inclined downward, and the inclined surface may include a reflecting plate 600 extending downward.

A reflective material such as aluminum capable of reflecting the light may be deposited on a top surface of the reflecting plate 600. The light emitted from the collimator 300 may be refracted in a direction toward the turn indicating array 700 through the reflecting plate 600.

The road surface pattern array 500 and the reflecting plate 600 may be integrally formed in one body.

Referring to FIG. 3, the turn indicating array 700 is disposed spaced apart from the road surface pattern array 500 in one direction. The light emitted from the collimator 300 and incident on the road surface pattern array 500 may be reflected by the reflecting plate 600 disposed on the road surface pattern array 500 and incident on the turn indicating array 700 in parallel with an optical axis of the turn indicating array 700.

The turn indicating array 700 may include a glass substrate 710, a second condenser lens 730 disposed in close contact with the other side surface of the glass substrate 710 and condensing the light emitted from the collimator 300, and a second projection lens 750 disposed in close contact with one side surface of the glass substrate 710 and projecting the light that has passed through the glass substrate 710 to diffuse.

The second condenser lens 730 is a convex lens convex in the other direction, and the second projection lens 750 is a concave lens concave in the other direction. The second condenser lens 730 may be a vertically and bilaterally symmetrical lens, and the second projection lens 750 may be a vertically and bilaterally asymmetrical lens.

The second condenser lens 730 and the second projection lens 750 may be arranged in the form of the micro lens array.

Light distributed from a side surface of the vehicle through the second projection lens 750 may be diffused in a light distribution pattern 790 indicating the travel direction of the vehicle 100.

In addition, referring to FIG. 5, the road surface pattern 590 indicated by the road surface pattern array 500 should be indicated to match the travel direction of the vehicle 100.

As used as a turn signal lamp of the vehicle 100, the light distribution pattern 790 diffused by the turn indicating array 700 may be set in a range of ±45 degrees in a left and right direction and ±15 degrees in a vertical direction with respect to a lateral direction of the vehicle 100 because the second projection lens 750 is the vertically and bilaterally asymmetrical lens.

Accordingly, a light distribution center of the road surface pattern 590 and a light distribution center of the light distribution pattern 790 may achieve 90 degrees.

The present technology as described above, which is the apparatus for implementing the plurality of functions using the micro lens array, which may simultaneously implement the travel direction road surface indicator function and the turn indicator function through the change in the optical structure of the micro lens array, may simplify a lamp package by integrating the turn indicator function and the travel direction road surface indicator function, and may reduce a load on a controller by simplifying function control because synchronization is unnecessary as the two functions are controlled by one light source.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The present technology, which may simultaneously implement the travel direction road surface indicator function and the turn indicator function through the change in the optical structure of the micro lens array, may simplify the lamp package by integrating the turn indicator function and the travel direction road surface indicator function, and may reduce the load on the controller by simplifying the function control because the synchronization is unnecessary as the two functions are controlled by one light source.

In addition, various effects that are directly or indirectly identified through the present document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for indicating a travel direction of a vehicle, comprising:
    a light source configured to generate light;
    a collimator configured to convert the light generated by the light source to straight light and emit the straight light downwardly;
    a road surface light projection unit configured to:
        receive the straight light emitted downwardly from the collimator and project, on a road surface adjacent to the vehicle, a first signal light indicating the travel direction of the vehicle; and
        reflect a portion of the received straight light in a direction vertically perpendicular to that of the straight light emitted from the collimator; and
    a turn indicating light projection unit spaced apart from the road surface light projection unit and configured to receive the portion of the straight light reflected by the road surface light projection unit and output a second signal light indicating the travel direction of the vehicle.

2. The apparatus of claim 1, wherein an optical axis of the straight light emitted from the collimator is parallel to that of the road surface light projection unit.

3. The apparatus of claim 1, wherein the road surface light projection unit comprises:
    an inclined surface, positioned at a side portion of the road surface light projection unit; and
    a reflecting plate positioned on the inclined surface and configured to reflect the portion of the straight light generated by the light source toward the turn indicating light projection unit.

4. The apparatus of claim 3, wherein an optical axis of the portion of the straight light reflected by the reflecting plate is parallel to that of the turn indicating light projection unit.

5. The apparatus of claim 3, wherein the road surface light projection unit and the reflecting plate are integrally formed.

6. The apparatus of claim 1, wherein the road surface light projection unit includes:
    a shield;
    a glass substrate positioned on a bottom surface of the shield;
    a condenser lens array positioned on a top surface of the shield and configured to condense the light emitted from the collimator; and a projection lens array positioned on a bottom surface of the glass substrate and configured to project, on the road surface, the light passing through the shield as the first signal light.

7. The apparatus of claim 6, wherein:
the condenser lens array comprises a first convex lens, and
the projection lens array comprises a second convex lens.

8. The apparatus of claim 7, wherein the first and second convex lenses are vertically and bilaterally symmetrical.

9. The apparatus of claim 1, wherein the turn indicating light projection unit comprises:
a glass substrate positioned to receive the portion of the light reflected by the road surface light projection unit, and
a projection lens array positioned on a first surface of the glass substrate and configured to project the portion of the light received by and passing through the glass substrate as the second signal light.

10. The apparatus of claim 9, wherein the turn indicating light projection unit further comprises a condenser lens array positioned on a second surface of the glass substrate and configured to condense the portion of the light reflected by the road surface light projection unit.

11. The apparatus of claim 10, wherein:
the condenser lens array comprises a convex lens, and
the projection lens array comprises a concave lens.

12. The apparatus of claim 11, wherein the convex and concave lenses are vertically and bilaterally asymmetrical.

* * * * *